United States Patent

Hsu

Patent Number: 6,120,701
Date of Patent: Sep. 19, 2000

[54] MICROENCAPSULATED LIQUID CRYSTAL AND A METHOD AND SYSTEM FOR USING SAME

[76] Inventor: Ying Yen Hsu, 2310 Friars La., Los Altos, Calif. 94024

[21] Appl. No.: 09/388,654

[22] Filed: Sep. 2, 1999

Related U.S. Application Data

[63] Continuation of application No. 08/827,574, Mar. 28, 1997.

[51] Int. Cl.[7] .......................... C09K 19/52; C09K 19/38; B01J 13/14

[52] U.S. Cl. ................. 252/299.01; 252/299.1; 264/4.7

[58] Field of Search ........................ 252/299.01, 299.4, 252/299.1; 349/86, 10, 92; 264/4.7

[56] References Cited

U.S. PATENT DOCUMENTS

| | | |
|---|---|---|
| 3,499,702 | 3/1970 | Goldmacher et al. . |
| 3,551,026 | 12/1970 | Heilmeier . |
| 3,872,050 | 3/1975 | Benton et al. . |
| 4,046,741 | 9/1977 | Scher . |
| 4,101,207 | 7/1978 | Taylor . |
| 4,138,362 | 2/1979 | Vassiliades et al. . |
| 4,155,741 | 5/1979 | Scher et al. . |
| 4,193,889 | 3/1980 | Baatz et al. . |
| 4,233,178 | 11/1980 | Fuchigami . |
| 4,285,720 | 8/1981 | Scher . |
| 4,435,047 | 3/1984 | Fergason . |
| 4,605,284 | 8/1986 | Fergason . |
| 4,707,080 | 11/1987 | Fergason . |
| 4,745,135 | 5/1988 | Thomas et al. . |
| 5,116,528 | 5/1992 | Mullen et al. . |
| 5,216,530 | 6/1993 | Pearlman et al. . |
| 5,283,675 | 2/1994 | Ooi et al. . |
| 5,335,101 | 8/1994 | Reamey . |
| 5,405,551 | 4/1995 | Reamey et al. . |
| 5,410,424 | 4/1995 | Konuma et al. . |
| 5,427,713 | 6/1995 | Wartenberg et al. . |
| 5,585,947 | 12/1996 | Havens et al. . |

FOREIGN PATENT DOCUMENTS

| | | |
|---|---|---|
| 8504262 | 9/1985 | European Pat. Off. . |
| 0 204 537 | 6/1986 | European Pat. Off. . |
| 0 238 626 | 9/1986 | European Pat. Off. . |
| 1-203494 | 8/1989 | Japan . |
| 1-268786 | 10/1989 | Japan . |

OTHER PUBLICATIONS

Derwent Abstract for DE 3029379, 1981.

Paul S. Drzaic; J. Appl. Phys. 60 (6), Sep. 15, 1986, 1986 American Institute of Physics, "Polymer Dispersed Nematic Liquid Crystal for Large Area Displays and Light Valves", pp. 2142–2148.

Paul S. Drzaic et al.; SID 90 Digest, "12.1: High–Brightness Reflective Displays Using Nematic Droplet/Polymer Films", pp. 210–213, 1990.

P.S. Drziac et al.; SID 92 Digest, "31.1: Invited Address: Dichroic–Based Displays from Nematic Dispersions", pp. 571–574, 1992.

(List continued on next page.)

*Primary Examiner*—Shean C. Wu

[57] ABSTRACT

Briefly, according to one aspect of the invention, liquid crystal material is microencapsulated by a method utilizing an interfacial polymerization reaction which creates a combination of polyurethane and polyurea polymers which form the capsule walls surrounding the discrete liquid crystal droplets. The formed capsule walls are designed to have an adjustable refractive index so as to allow for the matching of the refractive index to that of the liquid crystal and polymeric binder materials. This allows for the production of a liquid crystal droplet surrounded by polymer film, which is optically clear when the liquid crystal director is aligned with the electric field. The microencapsulated liquid crystal droplets improves the dye stability of a dichroic dye and enhances the contrast of a liquid crystal display.

17 Claims, 4 Drawing Sheets

OTHER PUBLICATIONS

P.P. Crooker et al.; SID 90 Digest, "12.2: A Color Display Using Polymer–Dispersed Chiral Liquid Crystals", pp. 214–216, 1990.

Deng–ke Yang et al.; SPIE vol. 1257 Liquid Crystal Displays and Applications (1990), "Textures of Polymer–Dispersed Chiral Liquid Crystal Microdroplets", pp. 60–67.

H. Molsen et al.; SID 92 Digest, "40.5: Deformed–Helix Ferroelectric Effect in Polymer–Dispersed Ferroelectric Liquid Crystals", pp. 773–775, 1992.

V. Ya. Zyryanov et al.; SID 92 Digest, "40.6: Polymer–Dispersed Ferroelectric Liquid Crystals as Display Materials", pp. 776–777, 1992.

Paul S. Drzaic et al.; SPIE vol. 1080 Liquid Crystal Chemistry, Physics and Applications (1989), "High Brightness and Color Contrast Displays Constructed from Nematic Droplet/Polymer Films Incorporating Pleochroic Dyes", pp. 41–47.

B.G. Wu and Y.D. Ma; SID 90 Digest, "12.3: Miniature Color Liquid Crystal Display", pp. 217–219, 1990.

John L. West et al.; SPIE vol. 1257 Liquid Crystal Displays and Applications (1990), Dichroic Dye Containing Polymer Dispersed Liquid Crystal (PDLC) Films, pp. 76–83.

MICROENCAPSULATED LIQUID CRYSTAL AND A METHOD AND SYSTEM FOR USING SAME

This application is a continuation of copending application Ser. No. 08/827,574 filed on Mar. 28, 1997.

TECHNICAL FIELD OF INVENTION

The present invention relates generally to liquid crystals and, more particularly, to microencapsulated liquid crystals and methods of making them. Additionally, the present invention relates to microencapsulated liquid crystals using dichroic, pleochroic or isotropic dyes.

BACKGROUND OF INVENTION

Liquid crystal materials are widely used in making liquid crystal displays for high content information flat panel devices, specifically for personal computers, projectors and televisions. Such devices usually require relatively low power and have a satisfactory response time, and are relatively economical. The property of liquid crystals enabling use, for example, in visual displays, is the ability of liquid crystals to transmit light on one hand, and to scatter light and/or absorb light, on the other, depending upon the alignment (or lack thereof) of the liquid crystal structure with respect to a prescribed input, such as an electrical field.

The conventional liquid crystal displays including twisted nematic, supertwisted nematic, thin film transistor twisted nematic and ferroelectric liquid crystal displays are prepared by filling liquid crystal materials directly into the liquid crystal display cells. These devices operate on the principle of light polarization. Due to the method in which the devices operate they suffer from reduced optical efficiency and require backlighting in order to achieve a good brightness on the display.

Currently there are three categories of liquid crystal materials, namely cholesteric, nematic and smectic types. The invention of the present application relates in the preferred embodiment described below to use of either a nematic, cholesteric, smectic A, or ferroelectric (chiral smectic C*) liquid crystal material or to a combination of liquid crystal types. The various characteristics of the cholesteric, nematic and smectic types of liquid crystal material are described in the prior art.

For many years, a class of new liquid crystal materials has been manufactured by treating such materials with a polymeric material to form a polymer dispersed liquid crystal for use in the manufacture of displays or other devices. U.S. Pat. No. 3,872,050, issued to Benton, relates to a polyurethane/liquid crystal dispersion system, in which cholesteric liquid crystal is dispersed as discrete naked aggregates in a polyurethane film. U.S. Pat. No. 4,101,207, issued to Taylor, relates to a liquid crystal/polymer film which is formed by: 1) casting a polymer solution containing liquid crystal, or 2) mixing liquid crystal with a polymerizable monomer or prepolymer followed by polymerization. More recently, these technologies have been improved further by the use of more suitable liquid crystal and polymeric binder materials to fabricate the electronic displays and light shutters, for example. These technologies basically include two distinct methods an emulsion method and a phase separation method.

An example of an emulsion method is disclosed in U.S. Pat. No. 4,435,047, issued to Fergason. The encapsulated liquid crystal droplets, which are dispersed in a polyvinyl alcohol film, are opaque in the off state. However, they become transparent when an electric field is applied. The polymer liquid crystal film called nematic curvilinear aligned phase (NCAP) film is prepared by emulsifying liquid crystal material, generally a nematic type liquid crystal material, in aqueous polyvinyl alcohol. The emulsion is drawn down on an indium-tin oxide coated substrate, which is then laminated by another indium-tin oxide film after drying. This liquid crystal/polymer film based on a light scattering does not require the polarizers to function. However, this manufacturing process permits contamination by the impurities which are contained in the process water and dispersing agents (e.g. polyvinyl alcohol or latex) to be transmitted to the liquid crystal material. In the Drzaic article, *Journal of Applied Physics*, Volume 60, No. 6, Sep. 15, 1986, at pages 2142–2148, it is reported that an aqueous based NCAP system is an interpenetrating network of liquid crystal in a polymer matrix, rather than an encapsulated liquid crystal. Furthermore, U.S. Pat. No. 4,707,080, issued to Fergason, relates to a plurality of liquid crystal volumes which are interconnected. In addition, U.S. Pat. No. 5,216,330, issued to Pearlman et al, relates to the encapsulation of a smectic phase liquid crystal material in a polymer matrix (known as NCAP). See also Drzaic et al article, *SID 90 Digest*, at pages 210–213.

EP 0238 626 relates to a phase separation method utilized to obtain a light modulating material. The material is prepared from an isotropic solution of liquid crystal and prepolymer, which can be a monomer or a mixture of a monomer and an oligomer. Under an ultraviolet or an electron beam irradiation, the liquid crystal droplets segregate from the insoluble polymer matrix. The liquid crystal droplets are then located in cavities within a continuous polymer matrix layer.

WO 85/04262 relates to liquid crystal droplets which are dispersed in an epoxy resin to form a new light modulating material. The film produced also exhibits an opaque characteristic in the off state, while exhibiting a clear characteristic when an electrical field is applied.

U.S. Pat. Nos. 3,499,702 and 3,551,026 relate to the incorporation of pleochroic dyes in liquid crystal materials, in order to enhance contrast. This is accomplished by the fact that pleochroic dyes align parallel to nematic liquid crystal director and respond to an electric field in a liquid crystal like manner.

In the Drzaic et al article, *SID 92 Digest*, at pages 571–574, it is reported that a dichroic based liquid crystal film prepared by NCAP technology demonstrates that there are possible applications, in portable high information density displays, without the requirement of backlighting. However, the device's useful life time is dependent upon capability of finding a dichroic dye with a long period of stability and the liquid crystal material's charge holding capability. The dichroic based NCAP film suffers problems due to the fact that the dye is exposed to moisture, air and ionic impurities existing in polymeric binder. As a result, dichroic dyes suffer stability problems.

For the polymer dispersed liquid crystal (PDLC) manufactured by a phase separation method, the liquid crystal material is dissolved in polymeric resin and placed between two indium tin oxide coated substrates and is irradiated by ultraviolet light or electron beam in order to cure the resin. The liquid crystal material used in a PDLC may be either nematic, cholesteric, or ferroelectric. See Drzaic et al article, *SID 90 Digest*, at pages 210–213; Crooker et al article, *SID 90 Digest*, at pages 214–216; Yang et al article, *SPIE Liquid Crystal Displays and Applications*, Volume 1257, 1990, at pages 60–67; Molsen et al article, *SID* 92 *Digest*, at pages 773–775; and Zyryadov et al article *SID* 92 *Digest*, at pages 776–777, for example. The optical films prepared by this method suffer some drawbacks as well. For instance, one of these drawbacks is the component in the system of liquid crystal/polymer are mutually soluble and can not be completely separated during phase separation. This causes a decrease in the liquid crystal/polymer film contrast, which specifically effect the dichroic based PDLC. This is due to the fact that only the dye dissolved in the liquid crystal droplets can exhibit the dichroic properties for the guest-host effect.

U.S. Pat. Nos. 4,285,720, 4,155,741, and 4,046,741 disclose a microencapsulation method by an interfacial polymerization of organic polyisocyanate intermediate to form a polyurea capsule. U.S. Pat. No. 4,138,362, issued to Vassiliades et al, relates to a method whereby the microcapsules are prepared by an interfacial cross linking of polyfunctional isocyanate dissolved in core materials and the dispersing agents contain recurring —$NH_2$, —NH, or hydroxy groups.

U.S. Pat. No. 4,193,889, issued to Baatz, relates to a method of microencapsulation with modified aliphatic polyisocyanates. However, Baatz does not disclose how to microencapsulate liquid crystal materials for display applications, where the capsule wall must be transparent and its refractive index must match that of the liquid crystal material and polymeric binder.

According to the present invention, the capsule wall refractive index is adjustable by an interfacial polymerization of polyurethane and polyurea structures and there also exists a highly cross-linked structure within the polymer film. Further, the capsule wall may be manufactured so as to be transparent, in order to be more suitable for use in an electronic display application.

SUMMARY OF THE INVENTION

This invention relates to a microcapsule comprising liquid crystal material encapsulated in polyurethane/polyurea or polyurea polymer walls. The liquid crystal material which is to be microencapsulated, may be either a nematic, cholesteric, smectic A, or ferroelectric (chiral smectic C*).

In another aspect this invention also relates to a composition for use in preparing microencapsulated liquid crystal material, comprising a liquid crystal material, a polyisocyanate, and a polyol or a polyamine. The starting materials necessary to form the polyurethane/polyurea or polyurea polymer walls to microencapsulate the liquid crystal material are produced by reacting a polyisocyanate, having at least two isocyanate groups (—NCO) and about 8 to 30 carbon atoms and is soluble in the liquid crystal material; and (B) a polyol or polyamine where the polyol is water soluble and contains at least two primary alcohol groups and the polyamine is also water soluble and contains at least two primary or secondary amino groups.

In still another aspect of this invention relates to a method of making a microencapsulated liquid crystal droplet with a capsule wall composed of a polyurethane/polyurea or polyurea polymer by the interfacial polymerization of a polyurethane or polyurea, wherein the liquid crystal material may contain a dichroic, pleochroic or isotropic dye.

Furthermore, the present invention relates to a method of preparing microencapsulated liquid crystal droplets, comprising the steps of (A) providing (1) a liquid crystal material containing a dichroic, a pleochroic, or isotropic dye, (2) a polyisocyanate and (3) a polyol or polyamine or both of them; and (B) interfacially polymerizing (2) and (3) to form a polyurethane/polyurea or polyurea polymer.

To optimize the contrast characteristics of a liquid crystal device comprised of microencapsulated liquid crystals, and more particularly, to avoid optical distortion, due to refraction of incident light passing from the encapsulating medium into the liquid crystal material and vice versa, the index of refraction of the encapsulating medium, binder and adhesive should be matched to the ordinary index of refraction of the liquid crystal material so as to be as much as possible the same. The closeness of the index matching will be dependent on the desired degree of contrast and transparency in the device, but the ordinary index of refraction of the crystal and the index of the encapsulating medium, dye, binder and adhesive will preferably differ by no more than 0.03, more preferably 0.01, especially 0.001.

The purpose of forming polyurethane linkage in the interfacial polymerization is designed to adjust capsule wall refractive index. In the absence of polyol and the presence of water, the —NCO group of polyisocyanate is hydrolyzed to $NH_2$ with the evolution of $CO_2$ and the formed $NH_2$ group reacts with free —NCO to form urea linkage. In this case only polyurea capsule wall film is formed. If a polyamine is added to the aqueous emulsifying solution, these chain extending agents react with —NCO group and also only polyurea capsule wall is formed. In order to modify the capsule wall structure, a polyol containing at least two primary OH groups may be added to the aqueous emulsifying solution to carry the polyurethane polymerization to compete with the polyurea polymerization derived from the —NCO and $NH_2$.

In yet another aspect the present invention relates to a device containing microencapsulated liquid crystal droplets. Such liquid crystal droplets may be substantially monodispersed, through separation by centrifuge. Devices in which such liquid crystal droplets may be used include, but are not limited to, TVS, computer display screens, and electronic display devices.

The present invention provides numerous benefits over the prior art. For example, the present invention incorporates dichroic, pleochroic, or isotropic dye into liquid crystal material which allows for enhanced display contrast by light absorption as well as light scattering. Further, the present invention allows for the production of a long-life, high contrast guest-host type of liquid crystal/polymer display which is suitable for reflective or trans-reflective mode personal computer and TV application. In addition, haze and viewing angle problems, that usually occur in the combination of different material with different refractive indices, is avoided by the present invention due to the ability of the present invention to allow for the matching of the refractive indices of the liquid crystal material, the microcapsule wall, the polymeric binder and the adhesive.

The wall refractive index may be adjusted by a number of methods. The first is by selecting the liquid crystal material, encapsulating material, polymeric binder and the adhesive so that their indices of refraction are substantially identical. In the first alternative, an epoxy resin can be added to the liquid crystal material and a water soluble hardener is added to the emulsifying solution. In the second alternative, a polycarboxylic acid chloride is added to the liquid crystal material and a water soluble polyamine is added to the emulsifying solution. These compounds are selected so that their refractive indices are matched with that of the liquid crystal material and the polymeric binder. In addition, the present microencapsulation method ensures the least probability of contamination of the liquid crystal material by the polymeric binder during the liquid crystal/polymer film preparation. This allows for the protection of the integrity of the liquid crystal material and dichroic, pleochroic, or isotropic dye enclosed in the capsule; to ensure that the device has a life time which will be long enough for use in a practical application.

Another advantage of the present invention is the incorporation of dichroic dye into the liquid crystal material which forms a guest-host display, where the dye is the guest and the liquid crystal material the host. As described previously, the dye incorporation enhances the display contrast because of the combination effect of light absorption and light scattering. When the guest-host display is unpowered it shows scattering and colored; when the display is powered, it shows a transparent and colorless state. Further the microencapsulation of the dichroic dye/liquid crystal material combination extends the lifetime of the display and provides a more stable display when compared to one produced with a NCAP guest host liquid crystal display.

Still another advantage of the present invention is the microencapsulated liquid crystal material can be stored for later use. This is due to the fact that the liquid crystal microcapsules are substantially more stable and thus are more easily handled to permit a higher degree of confidence when attempting to achieve a certain set of desired properties. Also, the present invention separates the microcapsules by centrifuging, which allows for the selection of microcapsules with a very small range of size variation. Therefore, the microcapsules obtained may be nearly monodispersed, thereby allowing the liquid crystal film produced to possess an improved multiplexibility, when compared to a film that contains a wide range of microcapsule sizes.

Finally, if a dichroic dye is chosen that is a primary color (blue, red or green) the resulting liquid crystal microcapsules can be utilized in producing a color filter by way of directly screen printing the microcapsules to the substrate.

DETAILED DESCRIPTION OF THE PREFERRED EMBODIMENTS

As discussed above, the present invention relates to composition comprising a liquid crystal material, polyisocyanate, and a polyol or polyamine. In one embodiment, from about 0.01 to about 0.16, or from about 0.02 to about 0.12, or from about 0.04 to about 0.08 parts polyisocyanate to each part liquid crystal. The polyamine, when present, is in an amount of from about 0.0034 to about 0.28, or from about 0.0051 to about 0.21, or from about 0.0068 to about 0.14 parts polyamine to each part liquid crystal. The polyol, when present, is in an amount from about 0.0063 to about 0.26, or from about 0.0094 to about 0.20, or from about 0.0126 to about 0.13 parts polyol to each part liquid crystal. Typically the water is present in an amount from about 1.19 to about 15.8, or from about 1.78 to about 11.9, or from about 2.38 to about 7.9 parts water to each part liquid crystal. However, the amount of water present does not affect polymerization. The water is present in order to dissolve the polyamine and/or polyol. Some of the water which is added to the reaction process actually comes from the addition of the polyamine and/or polyol since these reactants are in aqueous solutions. Some extra water may be added to compensate for the water lost to evaporation.

According to the present invention, the microencapsulated liquid crystal is prepared by an interfacial polymerization, e.g., polyaddition/polycondensation, to form either a polyurethane/polyurea or polyurea thin capsule wall which encloses the dispersed liquid crystal droplets. The polymers are prepared by reacting a polyisocyanate and at least one of a polyol or a polyamine.

The polyisocyanate contains from about 2 to about 8, or from about 2 to about 4, preferably 3 isocyanate (—NCO) groups. The polyisocyanate is capable of forming capsule wall, with a high cross linked density. The polyisocyanate typically contain from about 6 to about 30, or from about 8 to about 24, or from about 8 to about 24 carbon atoms. Here as well as elsewhere in the specification and claims, the range and ratio limits may be combined. The polyisocyanate may be aliphatic or aromatic.

The first substance (A) necessary to form the microcapsules can be any one of a number of commercially available starting materials, for example, Desmodur N-100 and N-3200 which are mainly a trimer of 1,6-hexamethylene diisocyanate and contain at least one biuret structure. Another possible starting material is Desmodur N-3390 which has an isocyanurate structure also derived from 1,6-hexamethylene diisocyanate. These materials are all available from Bayer Corporation. Their structures are given below:

The other trifunctional isocyanate is an adduct of trimethylolpropane and 1,6-hexamethylene diisocyanate with the following structure:

Other difunctional isocyanates can be utilized as starting materials. They are 1,6-hexamethylene diisocyanate, bis-(4-isocyanatocyclohexyl)methane, isophorone diisocyanate, tolylene-2,4-diisocyanate, tolylene-2,6-diisocyanate, diphenylmethane-4,4-diisocyanate, all available from Bayer Corporation. In one embodiment, the polyfunctional isocyanates may be soluble in liquid crystal material and do not react with the liquid crystal material or other components found in the liquid crystal material.

The second substance (B) necessary to the formation of a film which surrounds the liquid crystal material's droplets is a polyol or a polyamine (or both). In one embodiment, the starting materials are chosen for their low molecular weight and high solubility in water. From about 0.25 to about 10, or from about 0.5 to about 5, or from about 0.75 to about 2 parts of polyol and/or polyamine are reacted to each part polyisocyanate. Alternatively, from about 0.13 to about 26.5, or from about 0.2 to about 20.0, or from about 0.26 to about 13.5 equivalents of polyol and/or polyamine are reacted to each equivalent of isocyanate.

If a water soluble polyol contains at least two primary alcohol groups. The polyols generally contain from about 2 to about 8, or from about 2 to about 4 hydroxyl groups. The polyols typically contain from about 2 to about 18, or from about 2 to about 12 carbon atoms. The polyol may include polyhydric alkanolamine, such as ethanolamine and tris (hydroxymethyl)aminomethane. The alkanolamine typically contains two to three hydroxyl groups. The polyol may be a sulfur containing polythiol, such as a thiodiethanol. Examples of useful polyols include any one of a number of commercially available polyols, which include diethylene glycol, 2,2'-thiodiethanol, 2-mercaptoethylsulfide, 2-mercaptoethylether, triethylene glycol, 2-methylpropane-1,3-diol, 2-ethylpropane-1,3-diol, 2-n-propylpropane-1,3-diol, 2-n-butylpropane-1,3-diol, 2-methyl-2-n-butylpropane-1,3-diol, diethanolamine, triethanolamine, N-n-butyldiethanolamine, N-ethyldiethanolamine, N-methyldiethanolamine, tris(hydroxymethyl) aminomethane, trimethylolpropane, pentaerythritol, 1,4-butanediol, 1,6-hexanediol, 2,2-bis(hydroxymethyl) propionic acid, dimethylolmelamine, trimethylolmelamine, hexamethylolmelamine and mixtures thereof. Triethanolamine, N-n-butyldiethanolamine, N-ethyldiethanolamine, N-methyldiethanolamine, can serve as tertiary amine catalyst as well as film-forming polyol.

The water soluble polyamines may contain from about 2 to about 12, or from about 2 to about 6, or from about 2 to 4 nitrogen atoms. The polyamine may be alkylene polyamines which have alkylene groups having from about two to about six carbon atoms. Examples of useful polyamines include ethylenediamine, 1,4-butanediamine, 1,6-hexanediamine, diethylenetriamine, triethylenetetramine, tetraethylenepentamine, melamine or mixtures thereof.

In one embodiment, the reaction occurs in the presence of an aqueous solution of polyvinyl alcohol (PVA). Typically the aqueous solution has a concentration of about 5% to about 30%, or from about 7.5% to about 25%, or about 10% by weight PVA. Typically the aqueous solution is present in an amount from about 35% to about 95%, 50% to about 90%, or from about 65% to about 88% by weight.

Specifically the liquid crystal material may be, for example, either a nematic, cholesteric, or smectic liquid crystal material. Some commercially available examples of such are: FEE 1 (cyanoester mixture, available from Har Cherrakel Labs); E49 (available from BDH Chemicals, England); or S-3 (also available from BDH Chemicals, England).

In one embodiment, a small amount of a dopant, which is incorporated into the chosen liquid crystal material, is added to the liquid crystal material in order to improve the microencapsulation process or to enhance the microcapsules properties. The dopant may be, for example, a surfactant, a chiral compound, or an aligning agent. The surfactant may be, for example, Igepal CO-210, CO-420 or CO-430 (all available from GAF Corporation). The chiral compound may be, for example, C15 or CB15 (both available from BDH Chemicals, England). The aligning agent may be, for example, n-octadecyldimethyl[3(trimethoxysilyl)propyl] ammonumchloride, n-octyldecyltriethoxysilane, or (N,N-dimethyl-3-aminopropyl)trimethoxysilane available from Petrarch Systems.

In still another embodiment, the tertiary amine DABCO (an abbreviation for 1,4-diazabicyclo[2.2.2]octane, also called triethylenediamine), which is available from Aldrich Chemical Co., is used as a catalyst to enhance the reaction rate.

In still another embodiment, an emulsifying agent and dispersing agent may be used. The compound chosen may serve both functions. The compound may be, for example, polyvinyl alcohol (AIRVOL V165, V203, V205, and V325, all available from Air Products or EVANOL 71-30 available from duPont). In still another embodiment, a wetting agent is utilized in order to obtain a uniform coating on the indium tin oxide substrate surface. The wetting agent may be, for example, DC5098 (also known under the trade name Dow Corning 92-5098, which is a nonhydrolyzable silicon glycol copolymer).

When an aqueous solution, containing a mixture of one of the above combinations, is added to an emulsion of a liquid crystal material in aqueous emulsifying agent (e.g. Airvol V205, available from Air Products) the combination undergoes polymerization, such as polyaddition, with the polyfunctional isocyanate around the liquid crystal material's droplet surface, creating a microencapsulated liquid crystal droplet. Such a reaction may be accelerated by the addition of a tertiary amine. The tertiary amines include such as triethylenediamine (DABCO), triethylamine, tetramethyl-1, 3-butanediamine, N-methylmorpholine and mixtures thereof. In another embodiment, the reaction can be accelerated with a tin catalyst. The tin catalysts include dibutyltin diacetate, tributyltin acetate, dibutyltin dilaurate or mixtures thereof. The amount of tin catalyst used in the reaction may range between 0 and about 1%, or from about 0.1% to about 0.75% by weight of the total reaction mixture.

The polyisocyanate, while undergoing stirring, is mixed with the liquid crystal material. Sometimes the application of heat is necessary in order to assist in the mixing. Such an application of heat ensures a homogenous mixture. The temperature of the heating is typically from about 25 to about 90° C., preferably about 50 to about 70° C. The aqueous emulsifying solution is placed in a long neck beaker and maintained in a warm water bath at 50° C. The polyisocyanate/liquid crystal mixture is added to emulsifying solution, while it is undergoing vigorous stirring. The polyisocyanate/liquid crystal mixture is added to the emulsifying solution at a concentration of about 10 to about 70%, preferably 50%. The resulting solution is allowed to stand, while undergoing constant stirring, for two to three minutes or until the desired liquid crystal droplet size is obtained. As stated, the emulsion is stirred continuously at a moderate speed of about 2500 rpm to about 6500 rpm while its temperature is maintained in the range of about 40 to about 90° C., or from about 50 to about 60° C. The mixture is maintained at this temperature until the reaction is complete, which is from about 6 to about 12 hours, or about 8 to about 11 hours. During the reaction, the polyol and/or polyamine and catalyst is, if used, are added. Such an addition may be done separately or as a combined mixture. At the end of the polymerization, aqueous $NH_4OH$ solution is added to post-cure the active residual —NCO group. Usually the reaction is completed in about 6 to about 12 hours, or from about 8 to about 10 hours.

The aqueous emulsifying solution containing the excessive reactants is separated from the liquid crystal microcapsules by a centrifuging. The centrifuging is accomplished in a IEC HN-SII centrifuge. The centrifugation is generally carried out at a speed of 500 rpm to about 4500 rpm for about 10 to about 30 minutes. Typically only one set of centrifugation is required. However, multiple steps of centrifugation may be used to separate the aqueous emulsifying solution from the liquid crystal microcapsules. Through the use of different centrifuging speeds the capsule size distribution can be narrowed to nearly monodispersed microcapsules in different size ranges. The size of the liquid crystal microcapsules obtained by centrifuging is about 1 to about 9 microns, or from about 2 to about 8 microns, or more preferably from about 4 to about 7 microns.

The purified microcapsule wet cake can be stored for later application or can be used directly in optical film fabrication. For use the wet cake is thoroughly mixed with aqueous polymeric binder and small amount of wetting agent. The polymeric binder is typically used at a concentration of about 10 to about 30%, preferably 20%. The wetting agent is typically used at a concentration of about 0.3 to about 0.6%. After the removal of any air bubbles, the coating material is ready for the optical-film preparation. It is coated on a indium tin oxide polyester film by a doctor blade with a wet film thickness of about 1 mil (24 micron). The wet film is first air dried and then heated to remove the moisture. A layer of ultraviolet curable adhesive is applied to the dried coating film and another indium tin oxide polyester film is laminated on to it with a roller. The film is exposed under the ultraviolet light, in order to cure the adhesive, thus forming a liquid crystal/polymer film. The liquid crystal droplets are now microencapsulated by a very thin capsule wall of about 0.01 to about 0.1 micron.

The fabrication of pleochroic based liquid crystal/polymer film is the same as the above-mentioned process. The pleochroic dye used should be inactive to the chosen polyisocyanate film former. A pleochroic dye possessing the following characteristics is preferred: a high order parameter; high extinction coefficient; high photo stability; and high solubility in the chosen liquid crystal material.

The haze and obscurity are measured by using XL-211 Hazegard Hazemeter (available from Pacific Scientific). The visual 10% threshold voltage and 90% saturation voltage are measured at 60 Hz and sine wave.

Figure 1:
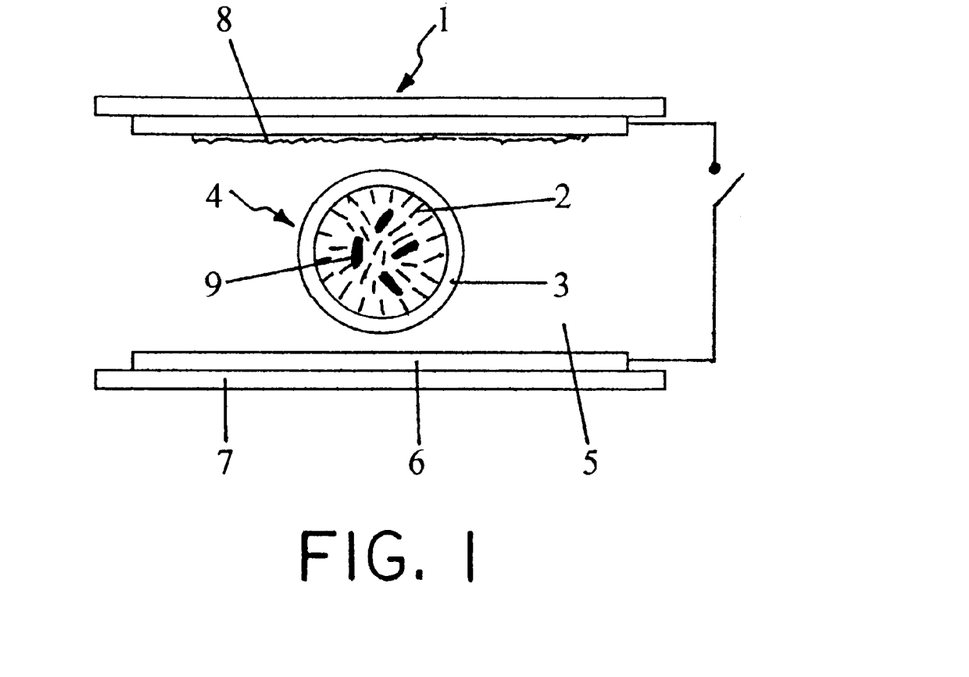
FIG. 1 is an illustration of a preferred liquid crystal display, in an unpowered state, made utilizing a microencapsulated liquid crystal material as created in accordance with the present invention.
Figure 2:
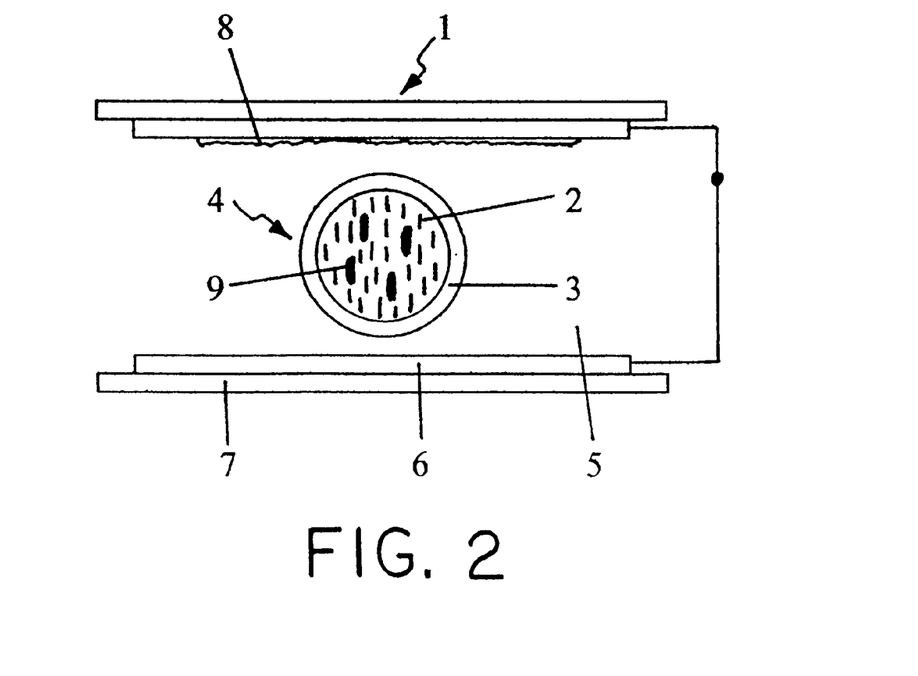
FIG. 2 is an illustration of a preferred liquid crystal display, in a powered state, made utilizing a microencapsulated liquid crystal material as created in accordance with the present invention.

Referring now in detail to the drawing, wherein like numerals designate like parts in the several figures, and initially FIG. 1 illustrates a preferred liquid crystal/polymer film display 1 of the present invention consisting of the liquid crystal droplets 2 microencapsulated by the capsule wall 3 to form the discrete liquid crystal microcapsules 4, which are dispersed in polymeric binder 5 and are coated on the indium tin oxide 6 coated substrate 7. A layer of adhesive 8 is applied, then it is laminated with another indium tin oxide 6 coated substrate 7 to form a liquid crystal/polymer film 1. In the unpowered state the mismatch of refractive index among the liquid crystal 2, capsule wall 3, adhesive layer 8 and binder 5 cause the film to scatter the light. As a result, the optical-film 1 is opaque or translucent. Turning now to FIG. 2, the device from FIG. 1 is depicted in a powered state. In this state the director of liquid crystal 2 align parallel to the applied field and the optical-film becomes clear and transparent. When the liquid crystal is impregnated with a pleochroic dye 9, the molecular long axis of dye will align parallel to nematic director. The optical-film 1 will then show light absorption as well as light scattering in the unpowered state (FIG. 1) and transmit the light in the powered state (FIG. 2). This enables for an enhanced contrast of the liquid crystal/polymer film.

The following examples relate to microencapsulated liquid crystal material. Unless the context clearly indicates otherwise, in the examples and throughout the specification and claims, amounts and ratios are by weight, temperature is in degrees Celsius, and pressure is atmospheric.

EXAMPLE 1

Desmodur N-3200 (0.25 g), available from Bayer Corporation, was dissolved in 5 g of FEE1 (cyanoester mixture, available from Har Cherrakel Labs) at 60° C., while undergoing stirring. The solution was then poured into a solution of 17 g of 10% polyvinyl alcohol (Airvol V205, available from Air Products), which was undergoing constant stirring, and was emulsified at 50 to 55° C., to obtain the particle size of 1 to 7 microns. The stirring speed was then reduced and the reaction was continued at 55° C. for 10 hours. During the reaction, 0.40 g of 10% DABCO (available from Aldrich Chemical Co.) and 0.34 g of 10% ethylenediamine (available from Aldrich Chemical Co.) were added to the solution. After the reaction was complete, 0.37 g of 10% $NH_4OH$ was added to the solution, then the solution was allowed to stand overnight, without heating or stirring. The resulting slurry was then purified using IEC HN-SII centrifuge to obtain narrow particle size distribution of 4 to 7 microns. The microencapsulated liquid crystal wet cake was re-dispersed in aqueous polymeric binder (e.g., Airvol V205 or NeoRez R967 latex, the later is available from Zeneca Resins) containing wetting reagent (DC5089) and was drawn down using a doctor blade (1 mil thick, available from Gardner Technical Service) on the indium tin oxide coated polyester sheet (available from Southwest Technologies). After allowing the film to dry, a layer of adhesive (e.g., NOA68, a polyurethane adhesive, available from Norland Optical Inc.) was applied and another indium tin oxide polyester sheet was laminated on to form a display film with a film thickness about 12 micron. The PVA-dispersed film exhibited an opaque characteristic in the OFF state and turned to semitransparent at 60 Volts and 60 Hz with 90% transmission.

EXAMPLE 2

Desmodur N-3200 (0.18 g) was dissolved in 3 g of E49 (available from BDH Chemicals, England) at 80° C., which was undergoing constant stirring. The mixture was then poured into a solution of 18 g of 10% PVA, also undergoing stirring, and emulsified using Dyna-Mix stirrer (available from Fisher Scientific) at 50° C. and 6500 rpm for 2 minutes, in order to obtain a particle size of 2 to 8 microns. The stirring speed was reduced to 2500 rpm and the reaction was continued at 55° C. for eight hours. During the reaction, 0.16 g of 50% triethylamine (available from Aldrich Chemical Co.), and 0.31 g of 10% ethylenediamine were added in two to four portions at 0.5 to 1 hour intervals. After 10-hour reaction, 0.37 g of 10% $NH_4OH$ was added to the solution, which was then allowed to stand overnight, without heating or stirring. The purification of the resulting slurry and the film preparation were the same as previously described. The PVA-dispersed film showed some haze at 60 to 70 Volts with 90% transmission.

EXAMPLE 3

Desmodur N-3200 (0.24 g) was dissolved in 4 g of FEE1 at 60° C., which was undergoing constant stirring. The mixture was poured into a solution of 17 g of 10% PVA, also undergoing stirring, and emulsified at 55° C. and 6500 rpm for 2 minutes. The particle size was about 1 to 9 microns. The reaction was continued at 2500 rpm and 55° C. for 11 hours. During the reaction, 0.40 g of 10% DABCO and 0.51 g of diethylene glycol (available from Aldrich Chemical Co.) were added to the solution in three portions at half an hour interval. After the reaction was complete, 0.37 g of 10% $NH_4OH$ was added to the solution. The resulting slurry was allowed to stand at room temperature, without heating or stirring. After purification by centrifugation, the wet cake was re-dispersed in NeoRez R967 and 20% PVA solution, respectively. The film prepared with NeoRez R967 showed some haze at 60 to 70 Volts with 90% transmission. While the film prepared with 20% PVA showed low haze at 30 to 40 Volts with 90% transmission.

EXAMPLE 4

Desmodur N-3200 (0.15 g) was added to 2.5 g of E49, the resulting mixture was then heated at 80° C., which was undergoing constant stirring, for 10 minutes and then poured into a solution of 18 g of 10% PVA, also undergoing stirring, and emulsified at 55° C. and 6500 rpm for 2 minutes. The particle size was about 1 to 6 microns. The reaction was continued at 2500 rpm and 55° C. for 10 hours. During the reaction, 0.60 g of 10% DABCO, 0.51 g of diethylene glycol, 0.07 g of dibutyltin diacetate (available from Aldrich Chemical Co.), and 0.20 g of 10% ethylenediamine were added to the solution in four portions at 0.5 to 1 hours intervals. After the reaction was complete 0.37 g of 10% $NH_4OH$ was added to the solution. The resulting slurry was again allowed to stand at room temperature, without heating or stirring. After purification by a centrifuge, the wet cake was re-dispersed in a solution of 20% PVA. The PVA prepared film showed low haze at 30 to 40 Volts with 90% transmission.

EXAMPLE 5

A mixture of 0.125 g of Desmodur N-3200 and 2.5 g of E49 was heated, which was undergoing constant stirring, to form a homogenous solution. The solution was then poured into a solution of 20 g of 10% PVA, also undergoing stirring. The mixture was then emulsified at 50° C. and 6500 rpm for 2.5 minutes. The particle size was about 1 to 5 microns. The reaction was continued at 2500 rpm and 50° C. for 8 hours. During the reaction, 0.64 g of 10% DABCO, 0.53 g of 2-methylpropane-1,3-diol (available from Aldrich Chemical Co.), and 0.11 g of dibutyltin diacetate (available from Aldrich Chemical Co.) were added to the solution. After the reaction was complete, 0.30 g of 10% $NH_4OH$ was added into the reaction mixture. The resulting slurry was then allowed to stand overnight. The slurry was then purified by a centrifuge. The PVA-dispersed film showed low haze at 35 Volts with 90% transmission.

EXAMPLE 6

A mixture of 0.15 g of Desmodur N-3200 and 2.5 g of E49 was heated to 80° C. for 10 minutes, which was undergoing constant stirring. The mixture was added into a solution of 20 g of 10% PVA, also undergoing stirring, and emulsified at 50° C. and 6500 rpm for 2 minutes. The particle size was about 1 to 6 microns. The reaction was continued at 3000 rpm and 50° C. for 10 hours. During the reaction, 1.00 g of 10% DABCO, 0.65 g of triethanolamine, 0.11 g of dibutyltin diacetate, and 0.20 g of 10% ethylenediamine were added to the solution. After the reaction was complete, 0.37 g of 10% $NH_4OH$ was added to the solution, and the heating was discontinued. The resulting slurry was purified using a centrifuge. The PVA-dispersed film showed low haze at 30 Volts with 90% transmission.

EXAMPLE 7

A mixture of 0.125 g of Desmodur N-3200 and 2.5 g of E49 was heated, which was undergoing constant stirring, to make a homogenous solution. The mixture was then poured into a solution of 20 g of 10% PVA, also undergoing stirring, and emulsified at 50° C. and 6500 rpm for 2 minutes. The particle size was about 1 to 5 microns. The stirring speed was turned down to 2500 rpm and the reaction was continued at 50° C. for 8 hours. During the reaction, 0.64 g of 10% DABCO, 0.83 g of triethylene glycol (available from Aldrich Chemical Co.), 0.05 g of dibutyltin diacetate, and 0.17 g of 10% ethylenediamine were added to the solution in portions, at intervals. After the reaction was complete, 0.37 g of 10% $NH_4OH$ was added to the reaction mixture. The resulting slurry was kept at room temperature overnight and purified using a centrifuge. The PVA-dispersed film showed some haze at 40 Volts with 90% transmission.

EXAMPLE 8

A mixture of 0.125 g of Desmodur N-3200 and 2.5 g of E49 was heated, which was undergoing constant stirring, to make a homogeneous solution. The mixture was poured into a solution of 20 g of 10% PVA, also undergoing stirring, and emulsified at 50° C. and 6500 rpm for 2 minutes. The particle size is about 1 to 6 microns. The emulsion was run at 50° C. and 2500 rpm for 8 hours. During this period, 0.64 g of 10% DABCO, 0.50 g of triethanolamine (available from Aldrich Chemical Co.) and 0.07 g of dibutyltin diacetate were added to the solution in portions at intervals. After the reaction was complete, 0.37 g of 10% $NH_4OH$ was added to the solution. The resulting slurry was allowed to stand overnight at room temperature. The slurry was then purified using a centrifuge. The PVA-dispersed film showed low haze at 30 Volts with 90% transmission.

EXAMPLE 9

A mixture of 0.125 g of Desmodur N-3200 and 2.5 g of E49 was heated, which was undergoing constant stirring, to make a homogenous solution The mixture was poured into a solution of 10 g of 10% PVA, also undergoing stirring, and emulsified at 50° C. and 6750 rpm for 2 minutes. The particle size was in the range of 1 to 7 microns. The emulsion was kept at 50° C. and 2500 rpm for 10 hours. During this period, 0.96 g of 10% DABCO and 0.72 g of 2-methyl-2n-butylpropane-1,3-diol (available from Aldrich Chemical Co.) were added to the solution in four portions, at one hour intervals. After 10 hours, 0.37 g of 10% NH$_4$OH was added to the solution. The resulting slurry was kept at room temperature overnight. The slurry was then purified using a centrifuge to obtain near mono-dispersed capsule size. The PVA-dispersed film showed some haze at 40 Volts with 90% transmission.

EXAMPLE 10

A mixture of 0.125 g of Desmodur N-3200 and 2.5 g of E49 was heated, which was undergoing constant stirring, to make a homogenous solution. The mixture was poured into a solution of 20 g of 10% PVA, also undergoing stirring, and emulsified at 50° C. and 6500 rpm for 2 minutes. The particle size was about 1 to 6 microns. The emulsion was kept at 50° C. and 2500 rpm for 10 hours. During this period, 0.72 g of 10% DABCO, 0.75 g of N-n-butyldiethanolamine (available from Aldrich Co.), and 0.20 g of 10% ethylenediamine were added to the solution in portions, at intervals. After 10 hours, 0.37 g of 10% NH$_4$OH was added to the solution. The resulting slurry was kept at room temperature overnight. The slurry was then purified using a centrifuge to obtain near mono-dispersed capsule size. The PVA-dispersed film showed some haze at about 40 Volts with 90% transmission.

EXAMPLE 11

A mixture of 0.1 g of D37 (available from BDH Chemicals) in 5 g of FEE1 was heated, which was undergoing constant stirring, for 2 hours and then kept at room temperature for six more hours. The resulting solution was filtered through 0.2 micron PTFA membrane (available from Aldrich Chemical Co). A mixture of 0.18 g of Desmodur N-3200 and 3 g of D37/FEE1 was heated, also while undergoing stirring, for 10 minutes. The resulting solution was then poured into a solution of 20 g of 10% PVA, also undergoing stirring. The resulting mixture was then emulsified at 50° C. and 6500 rpm for 2 minutes. The particle size was about 1 to 7 microns. The reaction was continued at 50° C. and 2500 rpm for 10 hours. During this period, 0.72 g of 10% DABCO and 0.51 g of diethylene glycol were added to the solution in portions, at intervals. After the reaction was complete, 0.37 g of 10% NH$_4$OH was added to the mixture. The resulting slurry was kept at room temperature overnight and purified using a centrifuge. The PVA-dispersed film showed low haze at 30 to 40 Volts with 90% transmission and a good contrast.

EXAMPLE 12

A mixture of 0.09 g of S 428 (a black dye mixture, available from Mitsui Toatsu Chemicals) in 6 g of E49 was heated, which was undergoing constant stirring, for 2 hours. The resulting solution was then kept at room temperature overnight. The solution was filtered through 0.2 microns PTFA membrane (available from Aldrich Chemical Co.). A mixture of 0.138 g of Desmodur N-100 and 2.3 g of S 428/E49 was heated, which was undergoing constant stirring, for 15 minutes and then poured into a solution of 20 g of 10% PVA, also undergoing stirring. The resulting mixture was then emulsified at 50° C. and 6500 rpm for 2 minutes. The particle size was about 1 to 6 microns. The reaction was continued at 50° C. and 2500 rpm for 10 hours. During this period, 0.60 g of 10% DABCO, 0.75 g of triethanolamine, 0.34 g of diethylene glycol, and 0.07 g of dibutyltin dilaurate (available from Aldrich Chemical Co.) were added to the solution in portions, at intervals. After the reaction was complete, 0.37 g of 10% NH$_4$OH was added to the solution. The resulting slurry was kept at room temperature overnight and then purified using a centrifuge to obtain a narrow capsule size distribution. The median volume size was 3.25 microns which was measured using Coulter LS 230 particle size analyzer (available from Coulter Corporation, Scientific Instruments). The dichroic based liquid crystal/polymer film was prepared with the same method as previously described (page 12 lines 17 to 29). The transmission and % haze were measured using XL-211 Hazegard Hazemeter (available from Pacific Scientific). The PVA-dispersed film showed low haze at 35 Volts with 90% transmission.

Figure 3:
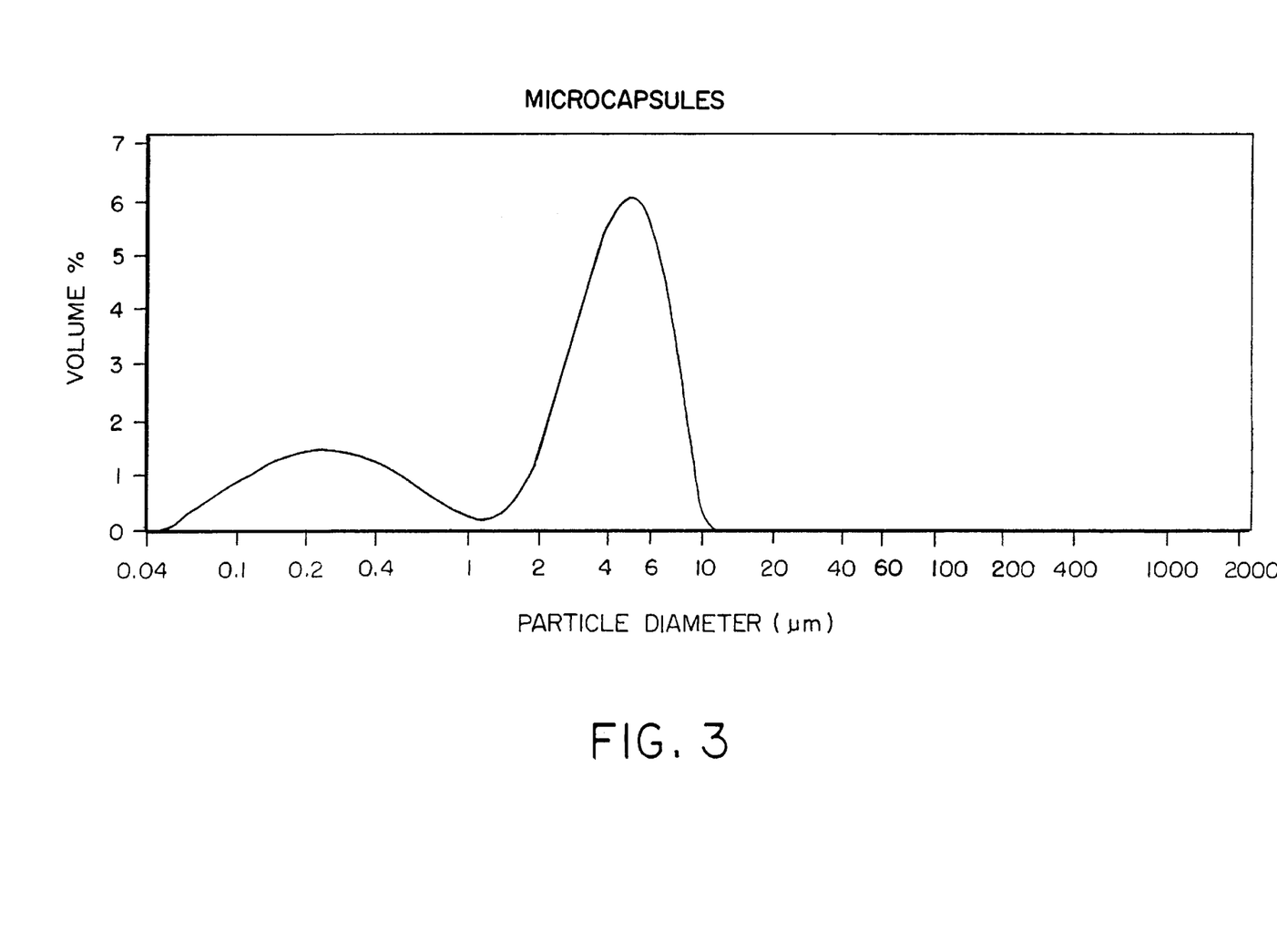
FIG. 3 is a graphical representation of the microcapsule particle size (in $\mu$m which is equal to microns) of the product prepared by the method disclosed in Example 12.
Figure 4A:
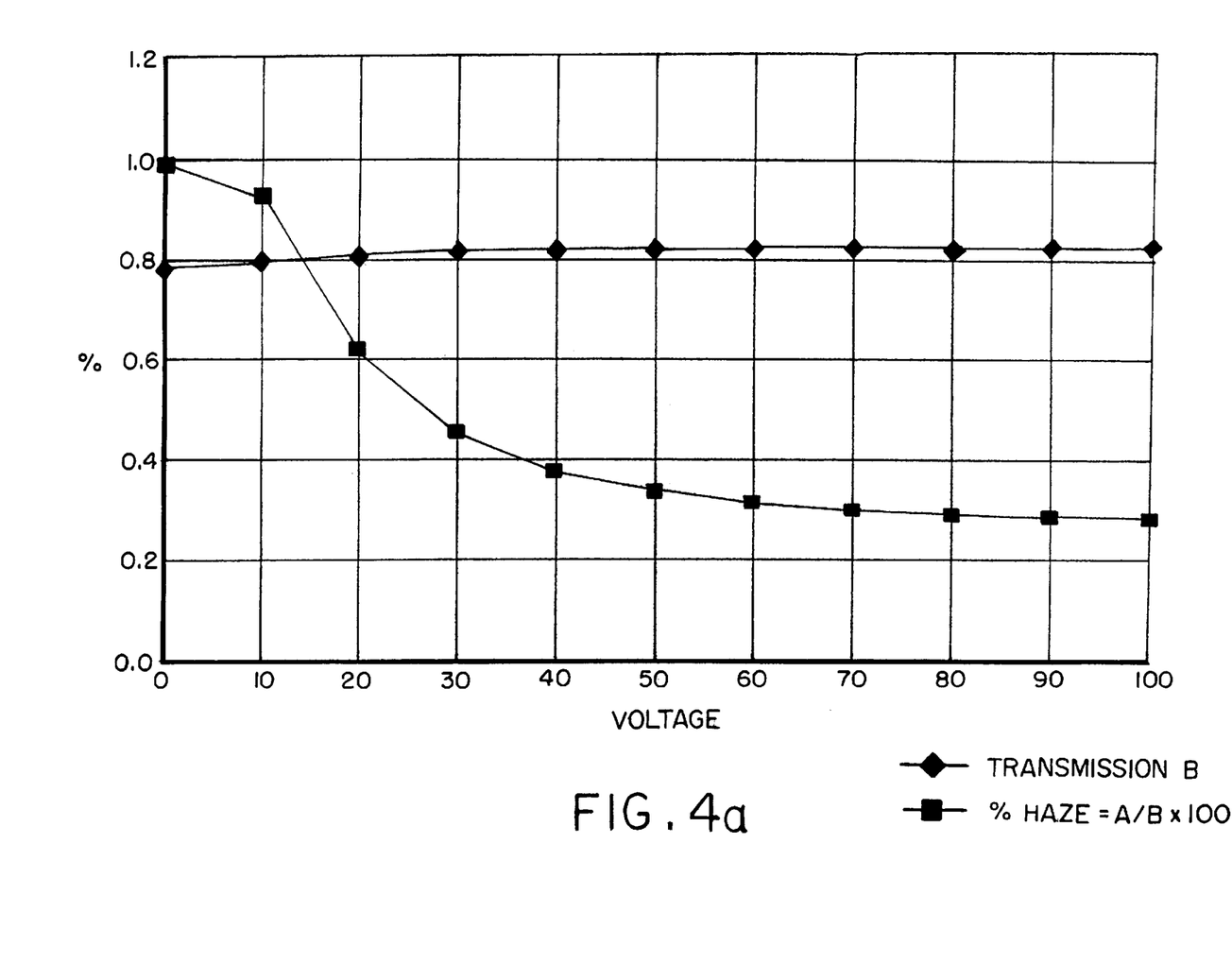
FIG. 4A is a graphical representation of the Transmission (♦) and % Haze (●) for Example 3, which is measured at a given voltages and 60 Hz.
Figure 4B:
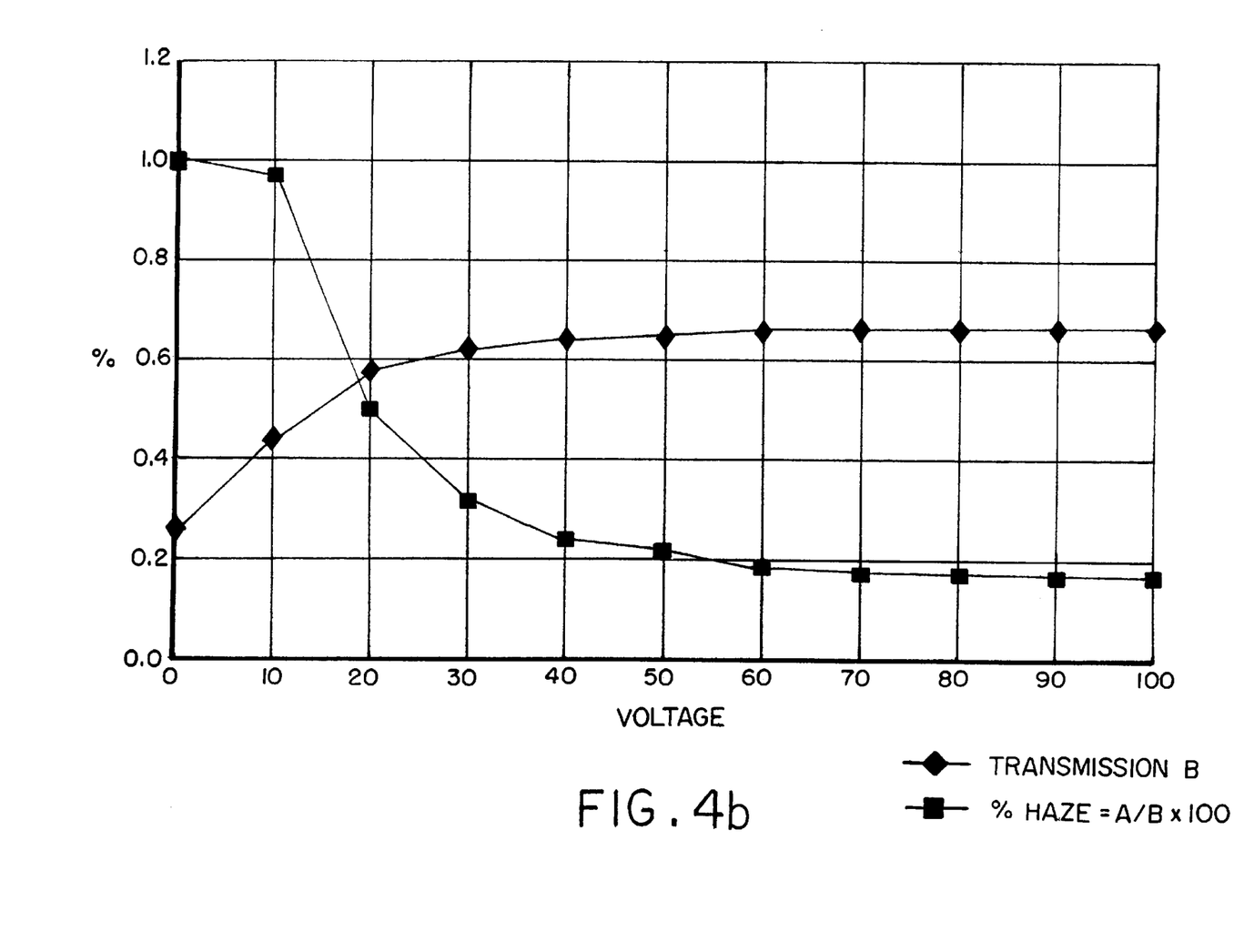
FIG. 4B is a graphical representation of the Transmission (♦) and % Haze (●) for Example 12, which is measured at a given voltages and 60 Hz.

The following Table 1 shows a data obtained from the samples of Example 3 and 12 using XL-211 Hazegard Hazemeter. FIG. 3 depicts a Particle Diameter Distribution graph from the sample of Example 12. FIGS. 4A and 4B depict a graphical representation of the Transmission (♦) and % Haze (●) from the data shown in Table 1.

TABLE I

| | Example 3 | | | Example 12 | | |
| --- | --- | --- | --- | --- | --- | --- |
| Voltage | Open Position A | Transmission B | % Haze = A/B × 100 | Open Position A | Transmission B | % Haze = A/B × 100 |
| 0 | 78.10% | 78.90% | 98.99% | 27.60% | 27.60% | 100.00% |
| 10 | 74.10% | 79.80% | 92.86% | 42.40% | 43.60% | 97.25% |
| 20 | 50.00% | 81.10% | 61.65% | 29.60% | 58.30% | 50.77% |
| 30 | 37.00% | 81.80% | 45.23% | 19.80% | 61.90% | 31.99% |
| 40 | 30.90% | 82.10% | 37.64% | 15.80% | 64.10% | 24.65% |
| 50 | 27.80% | 82.30% | 33.78% | 13.70% | 65.10% | 21.04% |
| 60 | 26.00% | 82.50% | 31.52% | 12.40% | 65.90% | 18.82% |
| 70 | 24.80% | 82.50% | 30.06% | 11.70% | 66.30% | 17.65% |
| 80 | 24.10% | 82.70% | 29.14% | 11.30% | 66.70% | 16.94% |
| 90 | 23.60% | 82.70% | 28.54% | 11.10% | 66.90% | 16.59% |
| 100 | 23.30% | 82.80% | 28.14% | 10.90% | 67.00% | 16.27% |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A liquid crystal article comprising a plurality of microencapsulated liquid crystal droplets, wherein each droplet is encapsulated within a polyurethane/polyurea or polyurea polymer wall, wherein the polyurethane/polyurea or polyurea wall is prepared by reacting a polyisocyanate with a polyol/polyamine derived from polyisocyanate or a polyamine, the polyisocyanate is selected from the group consisting of 1,6-hexamethylene diisocyanate, toluene-2,4-diisocyanate, toluene-2,6-diisocyanate, bis-(4-isocyanatocyclohexyl) methane, isophoronediisocyanate, diphenylmethane-4,4-diisocyanate, derivatives thereof and mixtures thereof, and the polyol or polyamine are selected from the group consisting of diethylene glycol, 2,2'-thiodiethanol, 2-mercaptoethylsulfide, 2-mercaptoethylether, triethylene glycol, 2-methylpropane-1,3-diol, 2-ethylpropane-1,3-diol, 2-n-propylpropane-1,3-diol, 2-n-butylpropane-1,3-diol, 2-methyl-2-n-butylpropane-1,3-diol, diethanolamine, triethanolamine, N-n-butyldiethanolamine, N-ethyldiethanolamine, N-methyldiethanolamine,tris(hydroxymethyl) aminomethane, trimethylolpropane, pentaerythritol, 1,4-butanediol, 1,6-hexanediol, 2,2-bis(hydroxymethyl) propionic acid, dimethylolmelamine, trimethylolmelamine, hexamethylolmelamine, ethylenediamine, 1,4-butanediamine, 1,6-hexanediamine, diethylenetriamine, triethylenetetramine, tetraethylenepentamine, melamine and mixtures thereof.

2. The microencapsulate of claim 1, wherein the liquid crystal droplets further contain dichroic, pleochroic, or isotropic dye.

3. The microencapsulate of claim 1, wherein the liquid crystal droplets further contain a combination of at least one dichroic dye and at least one isotropic dye.

4. The microencapsulate of claim 1, wherein the liquid crystal droplets are selected from the group consisting of nematic, smectic, cholesteric, ferroelectric, and mixtures thereof.

5. The microencapsulate of claim 1, wherein the liquid crystal material contains a dopant, said dopant is selected from a group consisting of a chiral compound, a surfactant or an aligning agent.

6. A composition for use in preparing microencapsulated liquid crystal droplets, comprising a liquid crystal material, a polyisocyanate, and a polyol/polyamine derived from polyisocyanate or a polyamine, the composition being substantially free of organic solvent, wherein the polyisocyanate and the polyol/polyamine derived from polyisocyanate or polyamine are reacted together to form a polyurethane/polyurea or polyurea polymer wall, the polyisocyanate is selected from the group consisting of 1,6-hexamethylene diisocyanate, toluene-2,4-diisocyanate, toluene-2,6-diisocyanate, bis-(4-isocyanatocyclohexyl) methane, isophoronediisocyanate, diphenylmethane-4,4-diisocyanate, derivatives thereof and mixtures thereof, and the polyol or polyamine are selected from the group consisting of diethylene glycol, 2,2'-thiodiethanol, 2-mercaptoethylsulfide, 2-mercaptoethylether, triethylene glycol, 2-methylpropane-1,3-diol, 2-ethylpropane-1,3-diol, 2-n-propylpropane-1,3-diol, 2-n-butylpropane-1,3-diol, 2-methyl-2-n-butylpropane-1,3-diol, diethanolamine, triethanolamine, N-n-butyldiethanolamine, N-ethyldiethanolamine, N-methyldiethanolamine, tris(hydroxymethyl) aminomethane, trimethylolpropane, pentaerythritol, 1,4-butanediol, 1,6-hexanediol, 2,2-bis(hydroxymethyl) propionic acid, dimethylolmelamine, trimethylolmelamine, hexamethylolmelamine, ethylenediamine, 1,4-butanediamine, 1,6-hexanediamine, diethylenetriamine, triethylenetetramine, tetraethylenepentamine, melamine and mixtures thereof.

7. A composition comprising at least one liquid crystal material containing a dichroic, pleochroic or isotropic dye, and at least one polyisocyanate having from about 8 to 30 carbons, where the polyisocyanate is soluble in the liquid crystal material; and at least one polyol/polyamine derived from polyisocyanate or polyamine, where the polyol is soluble in water and contains at least two primary alcohol groups and where the polyamine is soluble in water and contains at least two primary or secondary amino groups, the composition being substantially free of organic solvent, wherein the polyisocyanate and the polyol/polyamine derived from polyisocyanate or polyamine are reacted together to form a polyurethane/polyurea or polyurea polymer wall, the polyisocyanate is selected from the group consisting of 1,6-hexamethylene diisocyanate, toluene-2,4-diisocyanate, toluene-2,6-diisocyanate, bis-(4-isocyanatocyclohexyl) methane, isophoronediisocyanate, diphenylmethane-4,4-diisocyanate, derivatives thereof and mixtures thereof, and the polyol or polyamine are selected from the group consisting of diethylene glycol, 2,2'-thiodiethanol, 2-mercaptoethylsulfide, 2-mercaptoethylether, triethylene glycol, 2-methylpropane-1,3-diol, 2-ethylpropane-1,3-diol, 2-n-propylpropane-1,3-diol, 2-n-butylpropane-1,3-diol, 2-methyl-2-n-butylpropane-1,3-diol, diethanolamine, triethanolamine, N-n-butyldiethanolamine, N-ethyldiethanolamine, N-methyldiethanolamine, tris(hydroxymethyl) aminomethane, trimethylolpropane, pentaerythritol, 1,4-butanediol, 1,6-hexanediol, 2,2-bis(hydroxymethyl) propionic acid, dimethylolmelamine, trimethylolmelamine, hexamethylolmelamine, ethylenediamine, 1,4-butanediamine, 1,6-hexanediamine, diethylenetriamine, triethylenetetramine, tetraethylenepentamine, melamine and mixtures thereof.

8. The composition of claim 7, wherein the liquid crystal material contains a dichroic dye.

9. A liquid crystal article as in claim 1, comprising from about 0.01 to about 0.16 parts polyisocyanate to each part liquid crystal.

10. A liquid crystal article as in claim 1, comprising from about 0.0034 to about 0.28 parts polyamine to each part liquid crystal.

11. A liquid crystal article as in claim 1, comprising from about 0.0063 to about 0.26 parts polyol to each part liquid crystal.

12. A composition as in claim 6, wherein the composition comprises from about 0.01 to about 0.16 parts polyisocyanate to each part liquid crystal.

13. A composition as in claim 6 wherein the composition comprises from about 0.0034 to about 0.28 parts polyamine to each part liquid crystal.

14. A composition as in claim 6 wherein the composition comprises from about 0.0063 to about 0.26 parts polyol to each part liquid crystal.

15. A composition as in claim 7, wherein the composition comprises from about 0.01 to about 0.16 parts polyisocyanate to each part liquid crystal.

16. A composition as in claim 7 wherein the composition comprises from about 0.0034 to about 0.28 parts polyamine to each part liquid crystal.

17. A composition as in claim 7 wherein the composition comprises from about 0.0063 to about 0.26 parts polyol to each part liquid crystal.

* * * * *